US012563620B2

(12) United States Patent
Kang et al.

(10) Patent No.: US 12,563,620 B2
(45) Date of Patent: Feb. 24, 2026

(54) DYNAMIC INITIAL TRIGGER FRAME CONTROL IN EMLSR

(71) Applicant: MediaTek Inc., Hsinchu (TW)

(72) Inventors: Hao-Hua Kang, Hsinchu (TW); Chih-Chun Kuo, Hsinchu (TW)

(73) Assignee: MediaTek Inc. (TW)

( * ) Notice: Subject to any disclaimer, the term of this patent is extended or adjusted under 35 U.S.C. 154(b) by 199 days.

(21) Appl. No.: 18/116,366

(22) Filed: Mar. 2, 2023

(65) Prior Publication Data

US 2023/0337305 A1      Oct. 19, 2023

Related U.S. Application Data

(60) Provisional application No. 63/332,289, filed on Apr. 19, 2022.

(51) Int. Cl.
*H04W 76/15* (2018.01)
*H04W 52/02* (2009.01)

(52) U.S. Cl.
CPC ....... *H04W 76/15* (2018.02); *H04W 52/0274* (2013.01)

(58) Field of Classification Search
None
See application file for complete search history.

(56) References Cited

U.S. PATENT DOCUMENTS

| | | |
|---|---|---|
| 2020/0037357 A1 | 1/2020 | Chu et al. |
| 2021/0329500 A1 | 10/2021 | Cariou et al. |

| | | | |
|---|---|---|---|
| 2022/0104261 A1 | 3/2022 | Kwon et al. | |
| 2022/0303893 A1* | 9/2022 | Chu ...................... H04W 76/40 |
| 2022/0408508 A1* | 12/2022 | Chu ...................... H04L 1/1621 |
| 2023/0103061 A1* | 3/2023 | Shafin ............... H04W 52/0216 |
| | | | 370/311 |
| 2023/0109759 A1* | 4/2023 | Ratnam ............. H04W 56/0015 |
| | | | 370/329 |
| 2023/0199641 A1* | 6/2023 | Naik ..................... H04W 76/15 |
| | | | 370/318 |
| 2023/0199652 A1 | 6/2023 | Mehrnoush et al. | |
| 2023/0328669 A1* | 10/2023 | Naik ................. H04W 56/0015 |
| | | | 370/350 |

FOREIGN PATENT DOCUMENTS

| | | |
|---|---|---|
| WO | WO 2023122380 A1 | 6/2023 |
| WO | WO 2023146336 A1 | 8/2023 |

OTHER PUBLICATIONS

Taiwan Intellectual Property Office, Office Action in Taiwan Patent Application No. 112114562, Dec. 20, 2023.

(Continued)

*Primary Examiner* — Diane L Lo
(74) *Attorney, Agent, or Firm* — Andy M. Han; Han IP PLLC

(57) ABSTRACT

Techniques pertaining to dynamic initial trigger frame control in enhanced multi-link single radio (EMLSR) in wireless communications are described. A first multi-link device (MLD) performs a frame exchange with a second MLD on a first link of multiple communication links without transmission of an initial control frame. The first MLD then enables transmission of initial control frames in subsequent frame exchanges with the second MLD on the first link.

18 Claims, 9 Drawing Sheets

900 ⟍

PERFORM, BY A PROCESSOR OF A FIRST MULTI-LINK DEVICE (MLD), A FRAME EXCHANGE WITH A SECOND MLD ON A FIRST LINK OF MULTIPLE COMMUNICATION LINKS WITHOUT TRANSMISSION OF AN INITIAL CONTROL FRAME

910

ENABLE, BY THE PROCESSOR, TRANSMISSION OF ONE OR MORE INITIAL CONTROL FRAMES IN SUBSEQUENT FRAME EXCHANGES WITH THE SECOND MLD ON THE FIRST LINK

920

(56)     References Cited

OTHER PUBLICATIONS

European Patent Office, Extended European Search Report in European Patent Application No. 23165421.1, Aug. 29, 2023.
IEEE, "35. Extremely high throughput (EHT) MAC specification", IEEE Draft; TGBE_CL_35, IEEE-SA, Piscataway, NJ USA, vol. 802.11be drafts, No. D1.3, Nov. 17, 2021, pp. 1-104, XP068186660.

* cited by examiner

100

STA
120

STA
110

WIRELESS COMMUNICATIONS WITH DYNAMIC INITIAL TRIGGER FRAME CONTROL
IN MULTI-LINK SINGLE RADIO (EMLSR) MODE

700

| Control ID Value | Meaning | Disable Initial Control Frame? | Duration for Disabling Initial Control Frame |
|---|---|---|---|
| To be Determined (TBD) | Initial Control Frame Mode | 1 Bit (= 0 or 1) | TBD |

Figure 9:
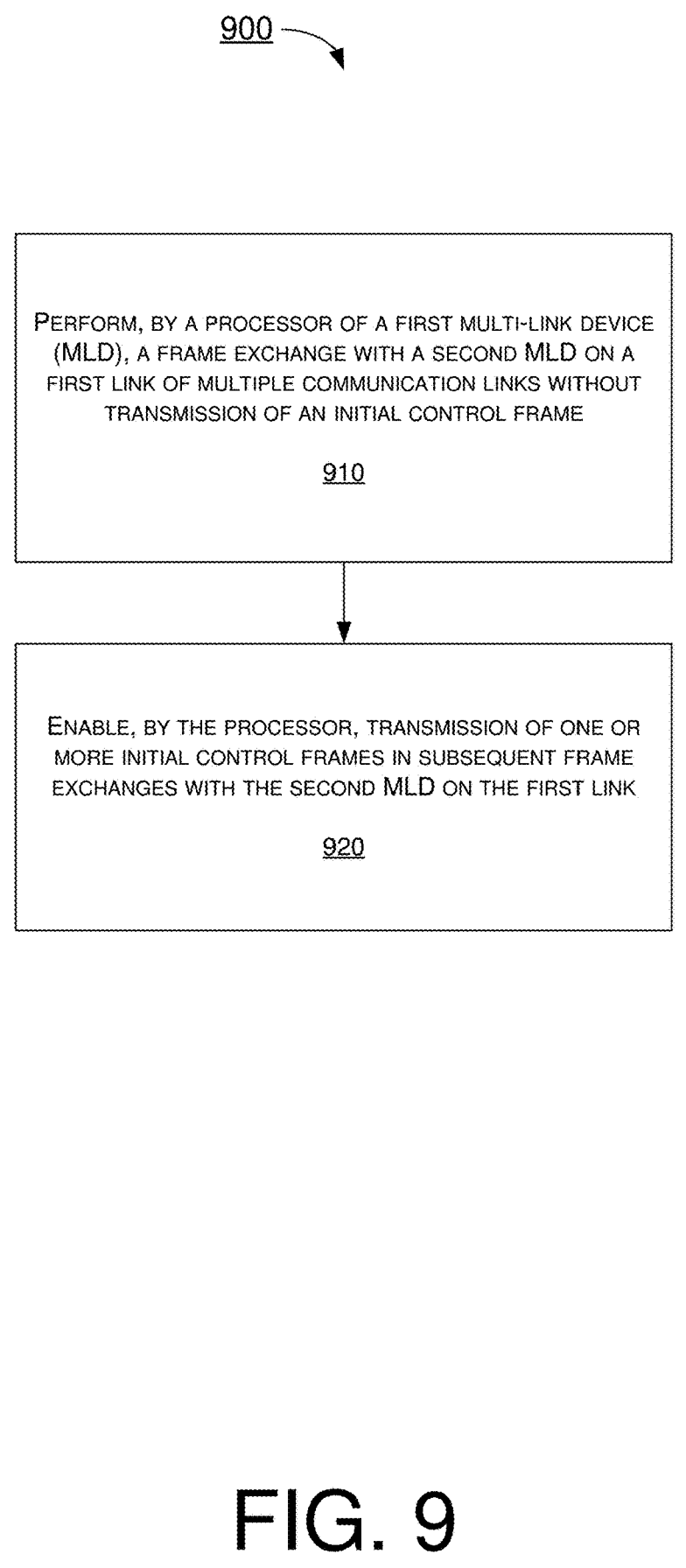

900

PERFORM, BY A PROCESSOR OF A FIRST MULTI-LINK DEVICE (MLD), A FRAME EXCHANGE WITH A SECOND MLD ON A FIRST LINK OF MULTIPLE COMMUNICATION LINKS WITHOUT TRANSMISSION OF AN INITIAL CONTROL FRAME

910

ENABLE, BY THE PROCESSOR, TRANSMISSION OF ONE OR MORE INITIAL CONTROL FRAMES IN SUBSEQUENT FRAME EXCHANGES WITH THE SECOND MLD ON THE FIRST LINK

DYNAMIC INITIAL TRIGGER FRAME CONTROL IN EMLSR

CROSS REFERENCE TO RELATED PATENT APPLICATION

The present disclosure is part of a non-provisional patent application claiming the priority benefit of U.S. Provisional Patent Application No. 63/332,289, filed 19 Apr. 2022, the content of which herein being incorporated by reference in its entirety.

TECHNICAL FIELD

The present disclosure is generally related to wireless communications and, more particularly, to dynamic initial trigger frame control in enhanced multi-link single radio (EMLSR) in wireless communications.

BACKGROUND

Unless otherwise indicated herein, approaches described in this section are not prior art to the claims listed below and are not admitted as prior art by inclusion in this section.

In wireless communications in accordance with the Institute of Electrical and Electronics Engineers (IEEE) standards such as Wi-Fi 7, a station (STA) may operate in the EMLSR mode on a specified set of enabled links (EMLSR links) between the STA and its associated access point (AP). In uplink (UL) frame exchanges between the AP and the STA on an EMLSR link, the STA can only begin frame exchanges on only one of the EMLSR links, and the AP cannot transmit frames to the STA on other EMLSR link(s) during the frame exchanges. In downlink (DL) frame exchanges between the AP and the STA, the AP can begin the frame exchanges with the STA on an EMLSR link with an initial control frame. The STA can receive a physical-layer protocol data unit (PPDU) sent using more than one spatial stream on that EMLSR link after receiving the initial control frame. The AP cannot transmit to the STA on other EMLSR link(s) until the end of the frame exchanges. Similarly, the STA cannot transmit or receive on other EMLSR link(s) until the end of the frame exchanges.

The initial control frame is defined as a multi-user request-to-send (MU-RTS) or buffer status report poll (BSRP) frame. The initial control frame is transmitted in a legacy rate (6/12/24 Mbps, orthogonal frequency-division multiplexing (OFDM) or non-high-throughput (non-HT) duplicated PPDU). The initial control frame needs to append extra padding based on the STA's antenna switching time. However, it is possible that the initial control frame may cause serious performance overhead. Since the STA may transition multiple EMLSR links to a power-save mode, if only one EMLSR link is in an active state and the STA stops listening to the EMLSR links that are in power-save mode, there needs to be a way so that the initial control frame can be avoided in this situation. It may not be desirable for the STA to leave the EMLSR mode in this case due to several frame exchanges with the AP to be applied in order to leave and enter the EMLSR mode again. Therefore, there is a need for a solution of dynamic initial trigger frame control in EMLSR in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to dynamic initial trigger frame control in EMLSR in wireless communications. Thus, it is believed that various schemes proposed herein may address or otherwise alleviate aforementioned issue(s), such as reduction in performance overhead.

In one aspect, a method may involve a first MLD performing a frame exchange with a second MLD on a first link of multiple communication links without transmission of an initial control frame. The method may further involve the first MLD enabling transmission of one or more initial control frames in subsequent frame exchanges with the second MLD on the first link.

In another aspect, an apparatus implementable in a first MLD may include a transceiver configured to communicate wirelessly and a processor coupled to the transceiver. The processor may perform a frame exchange with a second MLD on a first link of multiple communication links without transmission of an initial control frame. The processor may further enable transmission of one or more initial control frames in subsequent frame exchanges with the second MLD on the first link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 9 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dynamic initial trigger frame control in EMLSR in wireless communications. According to the present disclosure, a number of possible solutions may be implemented separately or jointly. That is, although these possible solutions may be described below separately, two or more of these possible solutions may be implemented in one combination or another.

Figure 1:
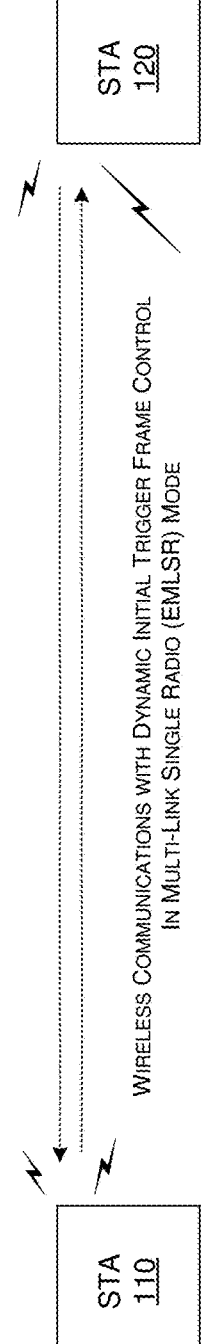
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 9 illustrate examples of implementation of various proposed schemes in network environment 100 in accordance with the present disclosure. The following description of various proposed schemes is provided with reference to FIG. 1~FIG. 9.

Referring to FIG. 1, network environment 100 may involve at least a first communication entity or STA 110 communicating wirelessly with a second communication entity or STA 120. Each of STA 110 and STA 120 may be a multi-link device (MLD) capable of operating in the EMLSR mode. Each of STA 110 and STA 120 may be an AP MLD or a non-AP MLD (herein interchangeably referred to as "STA MLD"), respectively. In some cases, STA 110 and STA 120 may be associated with a basic service set (BSS) in accordance with one or more IEEE 802.11 standards (e.g., IEEE 802.11be and future-developed standards) such as Wi-Fi 7. Each of STA 110 and STA 120 may be configured to communicate with each other by utilizing the various proposed schemes described herein pertaining to dynamic initial trigger frame control in EMLSR in wireless communications. It is noteworthy that, while the various proposed schemes may be individually or separately described below, in actual implementations each of the proposed schemes may be utilized individually or separately. Alternatively, some or all of the proposed schemes may be utilized jointly.

Figure 2:
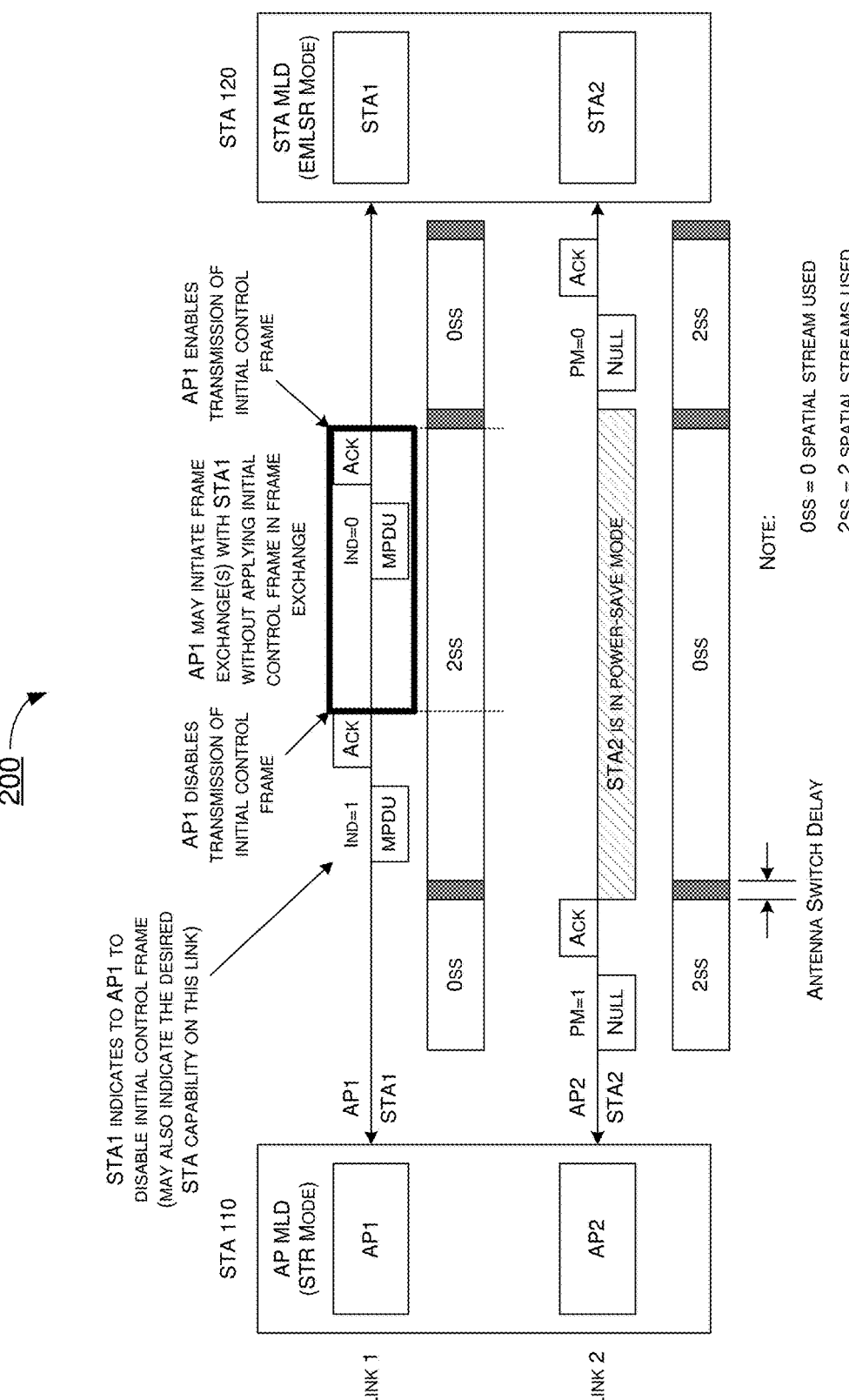
FIG. 2 is a diagram of an example scenario under a proposed scheme in accordance with the present disclosure.

FIG. 2 illustrates an example scenario 200 under a first proposed scheme in accordance with the present disclosure. Under the proposed scheme, a STA may explicitly indicate to an AP to request the AP to enable or disable from applying or transmission of an initial control frame in a frame exchange on the only EMLSR link that is an active mode. Referring to FIG. 2, a first AP (AP1) and a second AP (AP2) affiliated with an AP MLD (e.g., STA 110) may be in a multi-link operation (MLO) with a first STA (STA1) and a second STA (STA2) affiliated with a STA MLD (e.g., STA 120) on a first link (link 1) and a second link (link 2), respectively. The AP MLD may be in a simultaneous-transmission-and-reception (STR) mode while the STA MLD may be in the EMLSR mode. Moreover, the first link between AP1 and STA1 and the second link between AP2 and STA2 may be EMLSR links. In scenario 200, both the first link and the second link may be initially in the active mode for EMLSR. After STA2 sends a null frame (which may carry a power management (PM) field in a frame control field and set to 1) on the second link, which is acknowledged by AP2, STA2 may enter into a power-save mode, thereby rendering the second link to be in an inactive mode with respect to EMLSR and leaving the first link the only EMLSR link that is in the active mode, until STA2 later sends another null frame (which may carrying a PM field in a frame control field and set to 0) on the second link to exit the power-save mode. Under the proposed scheme, with the first link being the only EMLSR link in the activate mode, STA1 may send a medium access control (MAC) protocol data unit (MPDU) on the first link to indicate to AP1 (or to request AP1) to disable applying or transmission of an initial control frame in frame exchanges with STA1, which is acknowledged by AP1 on the first link. Optionally, the MPDU may also indicate one or more desired STA capabilities of STA1 on the first link. Afterwards, AP1 may initiate a frame exchange with STA1 on the first link without applying or transmission of an initial control frame. This frame exchange may end upon AP1 acknowledging another MPDU sent by STA1 on the first link with another indication to AP1 to request AP1 to enable applying or transmission of an initial control frame. Under the proposed scheme, AP1 may obtain access to a channel upon performing a backoff procedure and then initiate, on that channel, one or multiple TXOPs not requiring any initial control frame until STA1 indicates a need for an initial control frame.

Figure 3:
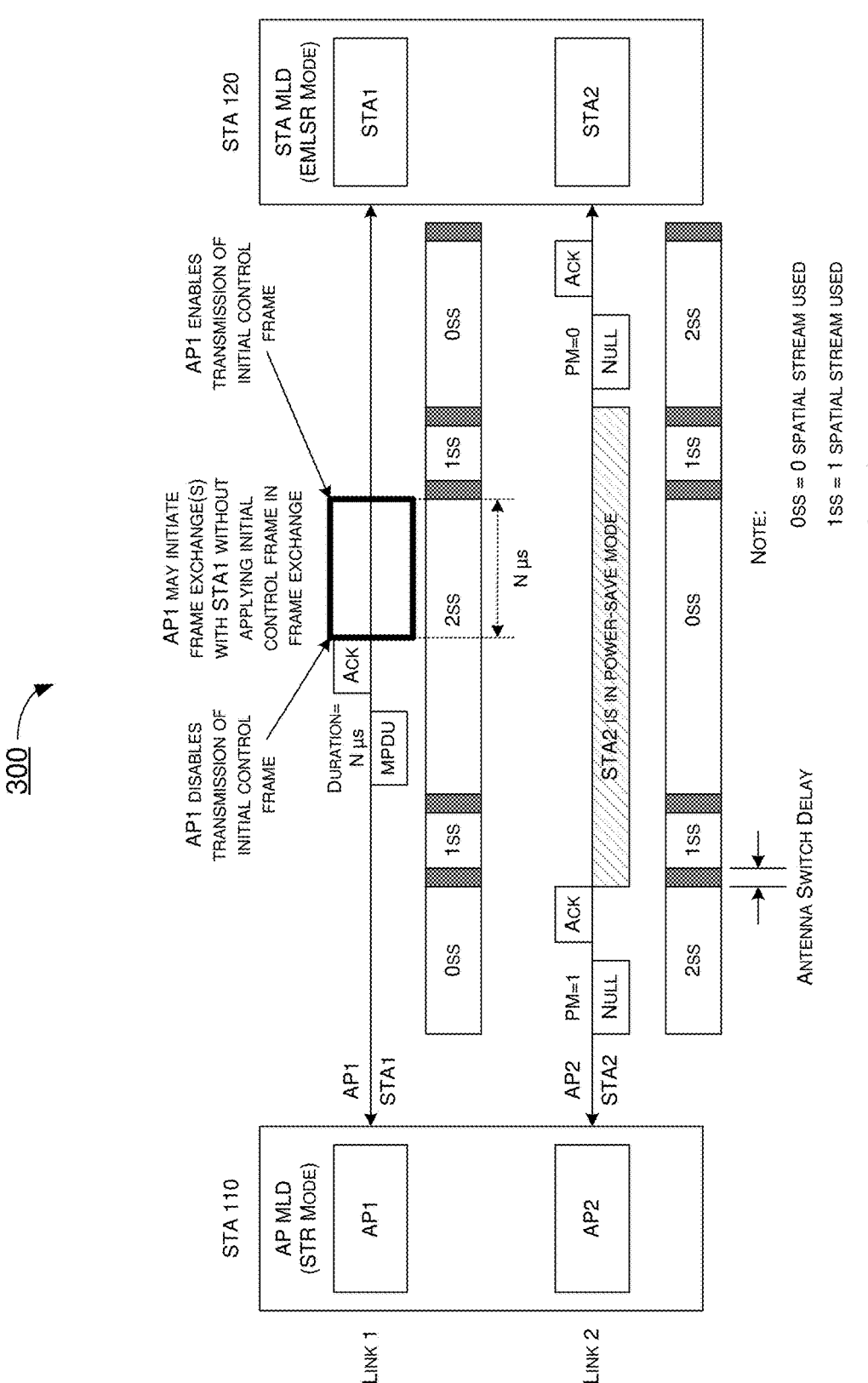
FIG. 3 is a diagram of an example scenario under a proposed scheme in accordance with the present disclosure.

FIG. 3 illustrates an example scenario 300 under a second proposed scheme in accordance with the present disclosure. Under the proposed scheme, an AP may disable from applying or transmission of an initial control frame in a frame exchange explicitly on the only EMLSR link that is an active mode for an indicated duration. Referring to FIG. 3, a first AP (AP1) and a second AP (AP2) affiliated with an AP MLD (e.g., STA 110) may be in an MLO with a first STA (STA1) and a second STA (STA2) affiliated with a STA MLD (e.g., STA 120) on a first link (link 1) and a second link (link 2), respectively. The AP MLD may be in an STR mode while the STA MLD may be in the EMLSR mode. Moreover, the first link between AP1 and STA1 and the second link between AP2 and STA2 may be EMLSR links. In scenario 300, both the first link and the second link may be initially in the active mode for EMLSR. After STA2 sends a null frame (which may carry a power management (PM) field in a frame control field and set to 1) on the second link, which is acknowledged by AP2, STA2 may enter into a power-save mode, thereby rendering the second link to be in an inactive mode with respect to EMLSR and leaving the first link the only EMLSR link that is in the active mode, until STA2 later sends another null frame (which may carrying a PM field in a frame control field and set to 0) on the second link to exit the power-save mode. Under the proposed scheme, with the first link being the only EMLSR link in the activate mode, STA1 may send an MPDU on the first link to indicate to AP1 (to request AP1) to disable applying or transmission of an initial control frame in frame exchanges, which is acknowledged by AP1 on the first link. The MPDU may also indicate a duration for which AP1 is to disable applying or transmission of an initial control frame for frame exchanges. Afterwards, AP1 may initiate a frame exchange with STA1 on the first link without applying or transmission of an initial control frame. This frame exchange may end at the end of the duration indicated in the MPDU. Under the proposed scheme, AP1 may obtain access to a channel upon performing a backoff procedure and then initiate, on that channel, one or multiple TXOPs not requiring any initial control frame until STA1 indicates a need for an initial control frame.

Figure 4:
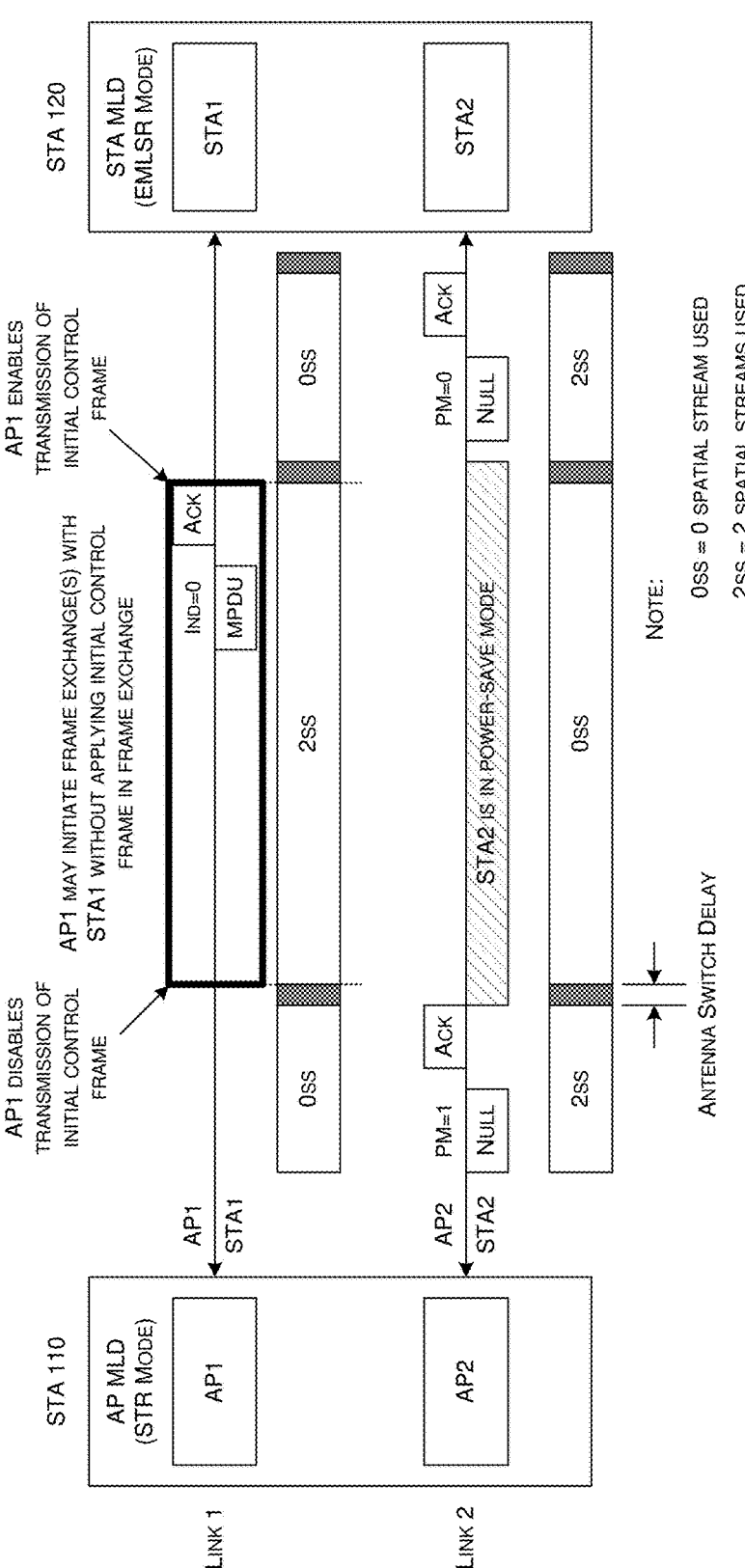
FIG. 4 is a diagram of an example scenario under a proposed scheme in accordance with the present disclosure.

FIG. 4 illustrates an example scenario 400 under a third proposed scheme in accordance with the present disclosure. Under the proposed scheme, an AP may disable from applying or transmission of an initial control frame in a frame exchange implicitly on the only EMLSR link that is an active mode once a STA has entered into a power-save mode in all other EMLSR links. Referring to FIG. 4, a first AP (AP1) and a second AP (AP2) affiliated with an AP MLD (e.g., STA 110) may be in an MLO with a first STA (STA1) and a second STA (STA2) affiliated with a STA MLD (e.g., STA 120) on a first link (link 1) and a second link (link 2), respectively. The AP MLD may be in an STR mode while the STA MLD may be in the EMLSR mode. Moreover, the first link between AP1 and STA1 and the second link between AP2 and STA2 may be EMLSR links. In scenario 400, both the first link and the second link may be initially in the active mode for EMLSR. After STA2 sends a null frame (which may carry a power management (PM) field in a frame control field and set to 1) on the second link, which is acknowledged by AP2, STA2 may enter into a power-save mode, thereby rendering the second link to be in an inactive mode with respect to EMLSR and leaving the first link the only EMLSR link that is in the active mode, until STA2 later sends another null frame (which may carrying a PM field in a frame control field and set to 0) on the second link to exit the power-save mode. Under the proposed scheme, with the first link being the only EMLSR link in the activate mode (upon STA2 entering the power-save mode on the second link), AP1 may initiate a frame exchange with STA1 on the first link without applying or transmission of an initial control frame. This frame exchange may end upon AP1 acknowledging an MPDU sent by STA1 on the first link with an indication to AP1 to request AP1 to enable applying or transmission of an initial control frame. Under the proposed scheme, AP1 may obtain access to a channel upon performing a backoff procedure and then initiate, on that channel, one or multiple TXOPs not requiring any initial control frame until STA1 indicates a need for an initial control frame.

Figure 5:
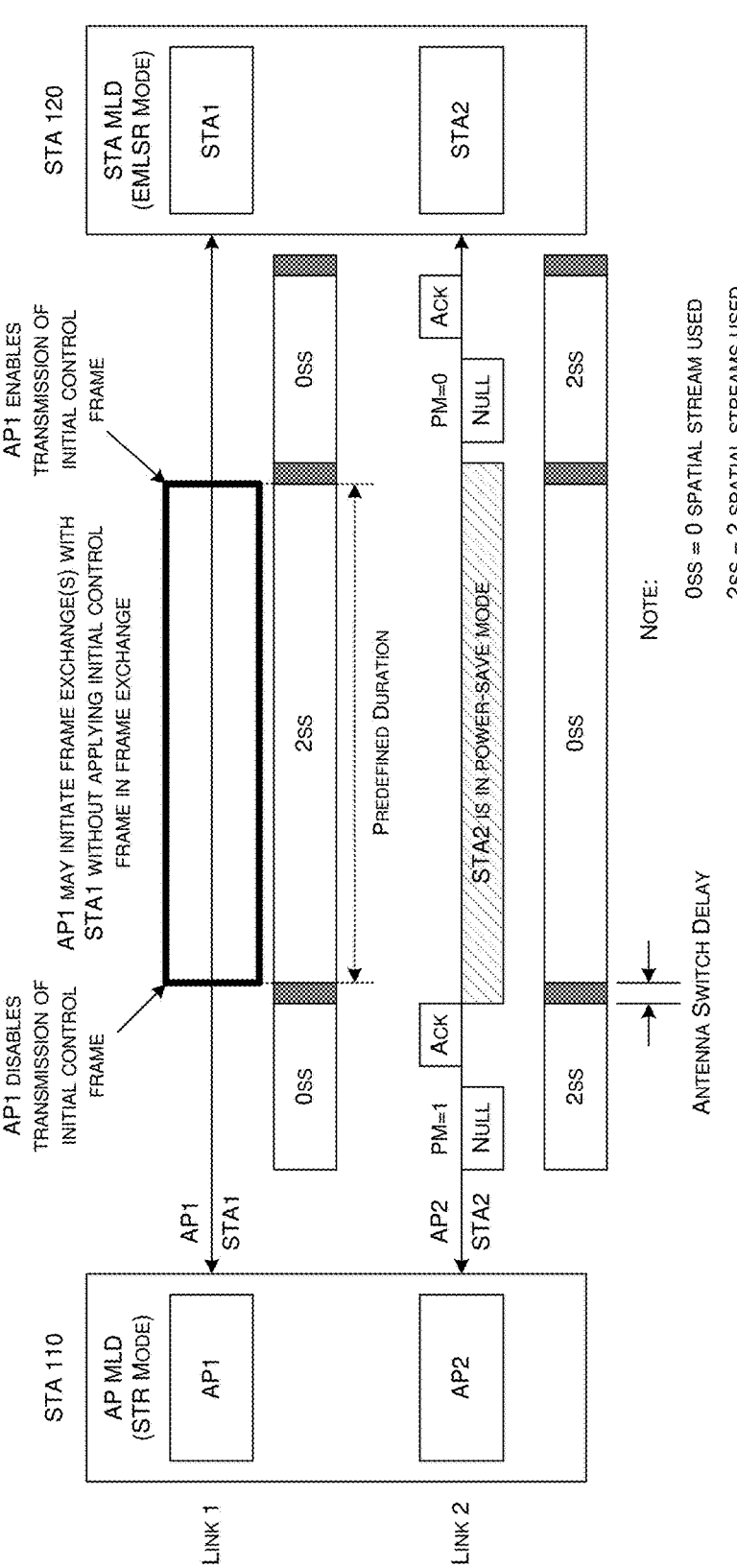
FIG. 5 is a diagram of an example scenario under a proposed scheme in accordance with the present disclosure.

FIG. 5 illustrates an example scenario 500 under a fourth proposed scheme in accordance with the present disclosure. Under the proposed scheme, an AP may disable from applying or transmission of an initial control frame in a frame exchange implicitly on the only EMLSR link that is an active mode for a predefined duration once a STA has entered into a power-save mode on all other EMLSR links. Referring to FIG. 5, a first AP (AP1) and a second AP (AP2) affiliated with an AP MLD (e.g., STA 110) may be in an MLO with a first STA (STA1) and a second STA (STA2) affiliated with a STA MLD (e.g., STA 120) on a first link (link 1) and a second link (link 2), respectively. The AP MLD may be in an STR mode while the STA MLD may be in the EMLSR mode. Moreover, the first link between AP1 and STA1 and the second link between AP2 and STA2 may be EMLSR links. In scenario 500, both the first link and the second link may be initially in the active mode for EMLSR. After STA2 sends a null frame (which may carry a power management (PM) field in a frame control field and set to 1) on the second link, which is acknowledged by AP2, STA2 may enter into a power-save mode, thereby rendering the second link to be in an inactive mode with respect to EMLSR and leaving the first link the only EMLSR link that is in the active mode, until STA2 later sends another null frame (which may carrying a PM field in a frame control field and set to 0) on the second link to exit the power-save mode. Under the proposed scheme, with the first link being the only EMLSR link in the activate mode (upon STA2 entering the power-save mode on the second link), AP1 may initiate a frame exchange with STA1 on the first link without applying or transmission of an initial control frame. This frame exchange may last for a predefined duration once STA2 enters the power-save mode on the second link. Thus, at the end of the predefined duration, the frame exchange may end and AP1 may enable applying or transmission of an initial control frame in frame exchanges with STA1. Under the proposed scheme, AP1 may obtain access to a channel upon performing a backoff procedure and then initiate, on that channel, one or multiple TXOPs not requiring any initial control frame until STA1 indicates a need for an initial control frame.

Figure 6:
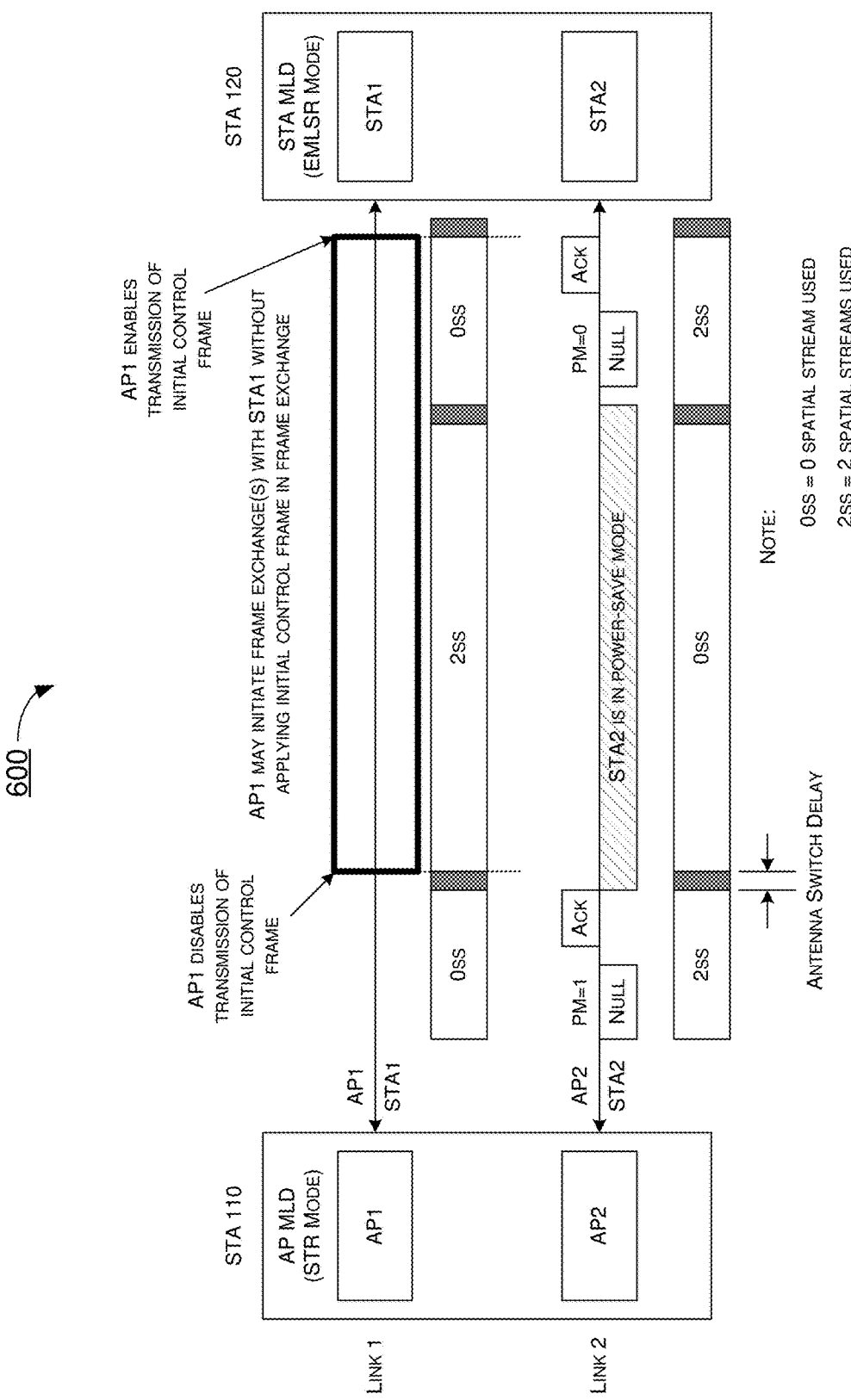
FIG. 6 is a diagram of an example scenario under a proposed scheme in accordance with the present disclosure.

FIG. 6 illustrates an example scenario 600 under a fifth proposed scheme in accordance with the present disclosure. Under the proposed scheme, an AP may disable from applying or transmission of an initial control frame in a frame exchange implicitly on the only EMLSR link that is an active mode once a STA has entered into a power-save mode on all other EMLSR links until any other EMLSR link leaves the power-save mode. Referring to FIG. 6, a first AP (AP1) and a second AP (AP2) affiliated with an AP MLD (e.g., STA 110) may be in an MLO with a first STA (STA1) and a second STA (STA2) affiliated with a STA MLD (e.g., STA 120) on a first link (link 1) and a second link (link 2), respectively. The AP MLD may be in an STR mode while the STA MLD may be in the EMLSR mode. Moreover, the first link between AP1 and STA1 and the second link between AP2 and STA2 may be EMLSR links. In scenario 600, both the first link and the second link may be initially in the active mode for EMLSR. After STA2 sends a null frame (which may carry a power management (PM) field in a frame control field and set to 1) on the second link, which is acknowledged by AP2, STA2 may enter into a power-save mode, thereby rendering the second link to be in an inactive mode with respect to EMLSR and leaving the first link the only EMLSR link that is in the active mode, until STA2 later sends another null frame (which may carrying a PM field in a frame control field and set to 0) on the second link to exit the power-save mode. Under the proposed scheme, with the first link being the only EMLSR link in the activate mode (upon STA2 entering the power-save mode on the second link), AP1 may initiate a frame exchange with STA1 on the first link without applying or transmission of an initial control frame. This frame exchange may be in effect until any other EMLSR link(s) (e.g., the second link) leaves the power-save mode. Thus, upon STA2 leaves the power-save mode after AP2 acknowledges the second null frame sent by STA2 to indicate (or to request AP2) to exit from the power-save mode, the frame exchange on the first link may end and AP1 may enable applying or transmission of an initial control frame in frame exchanges with STA1. Under the proposed scheme, AP1 may obtain access to a channel upon performing a backoff procedure and then initiate, on that channel, one or multiple TXOPs not requiring any initial control frame until STA1 indicates a need for an initial control frame.

Figure 7:
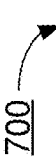
FIG. 7 is a diagram of an example design under a proposed scheme in accordance with the present disclosure.

It is noteworthy that, in all the above-described proposed schemes, the request or indication from a STA to an associated AP to enable or disable applying or transmission of the AP's initial control frame may be carried in an A-ctrl field. FIG. 7 illustrates an example design 700 under the proposed scheme. Referring to FIG. 7, a one-bit field may be utilized to indicate whether or not an AP is to disable applying or transmission of an initial control frame in a frame exchange on a given link (e.g., "0" means no and "1" means yes, or vice versa). Also, another field may be utilized to indicate a duration for which an AP is to disable applying or transmission of an initial control frame in a frame exchange on a given link.

Illustrative Implementations

Figure 8:
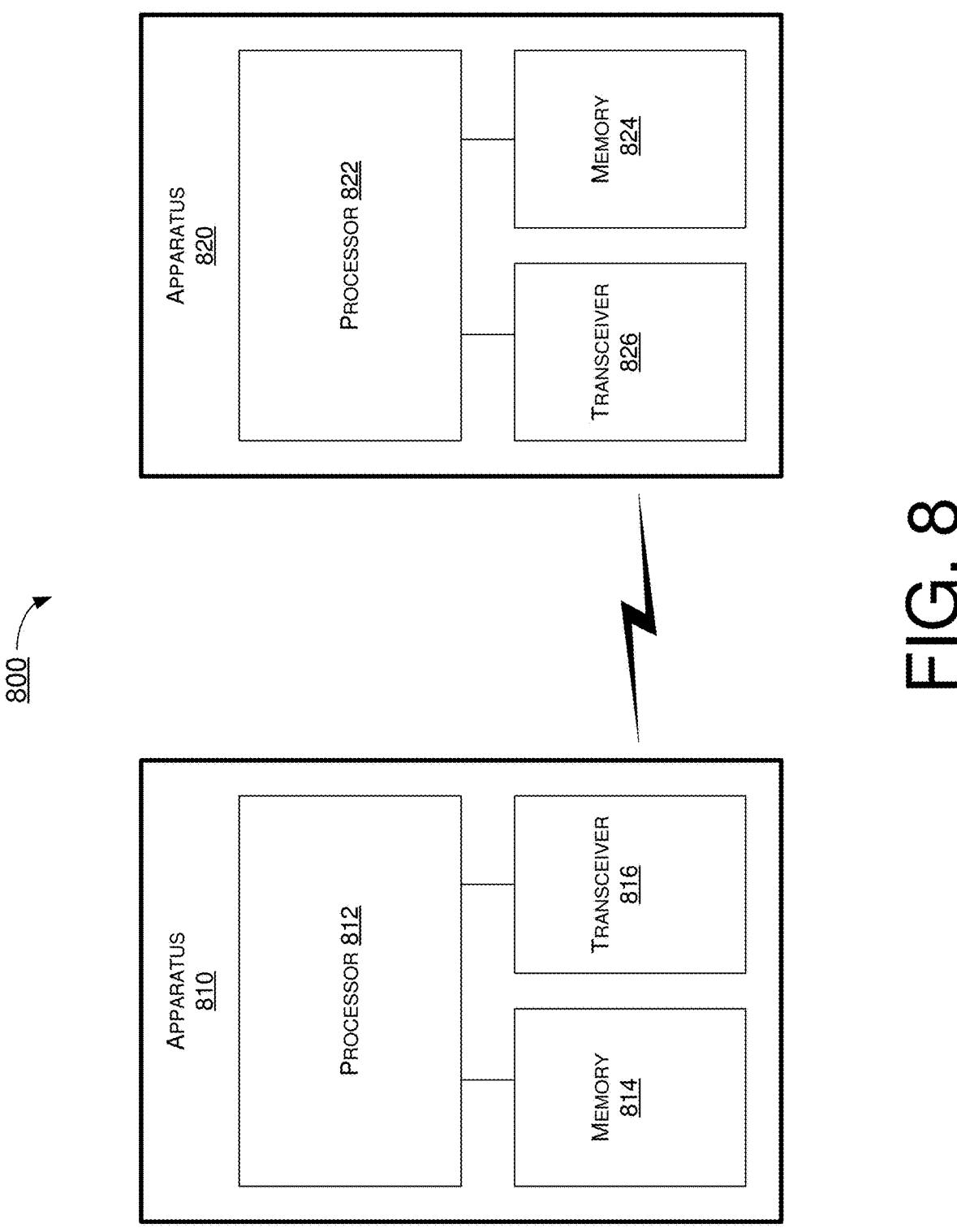
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to dynamic initial trigger frame control in EMLSR in wireless communications, including the various schemes described above with respect to various proposed designs, concepts, schemes, systems and methods described above as well as processes described below. For instance, apparatus 810 may be implemented in STA 110 and apparatus 820 may be implemented in STA 120, or vice versa.

Each of apparatus 810 and apparatus 820 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node, such as an AP in a WLAN.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 810 and apparatus 820 may be implemented in or as a STA or an AP. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to dynamic initial trigger frame control in EMLSR in wireless communications in accordance with various implementations of the present disclosure.

In some implementations, apparatus 810 may also include a transceiver 816 coupled to processor 812. Transceiver 816 may include a transmitter capable of wirelessly transmitting and a receiver capable of wirelessly receiving data. In some implementations, apparatus 820 may also include a transceiver 826 coupled to processor 822. Transceiver 826 may include a transmitter capable of wirelessly transmitting and a receiver capable of wirelessly receiving data. It is noteworthy that, although transceiver 816 and transceiver 826 are illustrated as being external to and separate from processor 812 and processor 822, respectively, in some implementations, transceiver 816 may be an integral part of processor 812 as a system on chip (SoC) and/or transceiver 826 may be an integral part of processor 822 as a SoC.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as STA 110, and apparatus 820, as STA 120, is provided below. It is noteworthy that, although a detailed description of capabilities, functionalities and/or technical features of apparatus 820 is provided below, the same may be applied to apparatus 810 although a detailed description thereof is not provided solely in the interest of brevity. It is also noteworthy that, although the example implementations described below are provided in the context of WLAN, the same may be implemented in other types of networks.

Under various proposed schemes pertaining to dynamic initial trigger frame control in EMLSR in wireless communications in accordance with the present disclosure, with apparatus 810 implemented in or as STA 110 functioning as a first MLD and apparatus 820 implemented in or as STA 120 functioning as a second MLD in network environment 100, processor 812 of apparatus 810 may perform, via transceiver 816, a frame exchange with a second MLD (e.g., apparatus 820) on a first link of multiple communication links without transmission of an initial control frame. Moreover, processor 812 may enable, via transceiver 816, transmission of one or more initial control frames in subsequent frame exchanges with the second MLD on the first link.

In some implementations, in performing the frame exchange without the transmission of the initial control frame on the first link, processor 812 may disable transmission of the initial control frame on the first link when the first link is an EMLSR link in an active mode while remaining one or more other links of the multiple communication links are not (e.g., the first link is the only EMLSR link in the active mode).

In some implementations, in performing the frame exchange without the transmission of the initial control frame, processor 812 may perform certain operations. For instance, processor 812 may receive, from a STA affiliated with the second MLD, a first MPDU requesting to disable transmission of the initial control frame. Moreover, processor 812 may disable transmission of the initial control frame in the frame exchange with the STA on the first link responsive to receiving the first MPDU. In such cases, in enabling the transmission of the one or more initial control frames, processor 812 may perform certain operations. For instance, processor 812 may receive, from the STA, a second MPDU during the TXOP requesting to enable the transmission of the one or more initial control frames in the subsequent frame exchanges. Furthermore, processor 812 may enable the transmission of the one or more initial control frames in the subsequent frame exchanges with the STA on the first link responsive to receiving the second MPDU.

Alternatively, or additionally, in performing the frame exchange without the transmission of the initial control frame, processor 812 may perform certain operations. For instance, processor 812 may receive, from a STA affiliated with the second MLD, a MPDU requesting to disable transmission of the initial control frame. Additionally, processor 812 may disable transmission of the initial control frame in the frame exchange with the STA on the first link for a duration indicated in the MPDU responsive to receiving the MPDU. In such cases, in enabling the transmission of the one or more initial control frames, processor 812 may enable the transmission of the one or more initial control frames in the subsequent frame exchanges with the STA on the first link at an end of the duration.

Alternatively, or additionally, in performing the frame exchange without the transmission of the initial control frame, processor 812 may perform certain operations. For instance, processor 812 may determine that a second STA affiliated with the second MLD enters a power-save mode on a second link of the multiple communication links, thereby rendering the first link to be an EMLSR link in an active mode while remaining one or more other links of the multiple communication links are not (e.g., the first link is the only EMLSR link in the active mode). Moreover, processor 812 may disable transmission of the initial control frame in the frame exchange with a first STA affiliated with the second MLD on the first link responsive to determining that the second STA is entering the power-save mode on the second link. In such cases, in enabling the transmission of the one or more initial control frames, processor 812 may take one of several approaches.

In a first approach, in enabling the transmission of the one or more initial control frames, processor 812 may receive, from the first STA, a MPDU during the TXOP requesting to enable the transmission of the one or more initial control frames in the subsequent frame exchanges. Additionally, processor 812 may enable the transmission of the one or more initial control frames in the subsequent frame exchanges with the first STA on the first link responsive to receiving the MPDU.

In a second approach, in enabling the transmission of the one or more initial control frames, processor 812 may enable the transmission of the one or more initial control frames in the subsequent frame exchanges with the first STA on the first link after passage of a predefined duration since remaining one or more other STAs affiliated with the second MLD, other than the first STA, entered the power-save mode.

In a second approach, in enabling the transmission of the one or more initial control frames, processor 812 may determine that the second STA or one other STA affiliated with the second MLD is exiting the power-save mode on the second link or another link of the multiple communication links, thereby rendering the first link to be not the only-one remaining EMLSR link in the active mode. Furthermore, processor 812 may enable the transmission of the one or more initial control frames in the subsequent frame exchanges with the first STA on the first link responsive to determining that the second STA or the other STA is exiting the power-save mode.

Illustrative Processes

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to dynamic initial trigger frame control in EMLSR in wireless communications in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 implemented in or as STA 110 functioning as a non-AP STA and apparatus 820 implemented in or as STA 120 functioning as an AP STA of a wireless network such as a WLAN in network environment 100 in accordance with one or more of IEEE 802.11 standards. Process 900 may begin at block 910.

At 910, process 900 may involve processor 812 of apparatus 810, as a first MLD (e.g., STA 110), performing, via transceiver 816, a frame exchange with a second MLD (e.g., apparatus 820) on a first link of multiple communication links without transmission of an initial control frame. Process 900 may proceed from 910 to 920.

At 920, process 900 may involve processor 812 enabling, via transceiver 816, transmission of initial control frames in subsequent frame exchanges with the second MLD on the first link.

In some implementations, in performing the frame exchange without the transmission of the initial control frame on the first link, process 900 may involve processor 812 disabling transmission of the initial control frame on the first link when the first link is an EMLSR link in an active mode while remaining one or more other links of the multiple communication links are not (e.g., the first link is the only EMLSR link in the active mode).

In some implementations, in performing the frame exchange without the transmission of the initial control frame, process 900 may involve processor 812 performing certain operations. For instance, process 900 may involve processor 812 receiving, from a STA affiliated with the second MLD, a first MPDU requesting to disable transmission of the initial control frame. Moreover, process 900 may involve processor 812 disabling transmission of the initial control frame in the frame exchange with the STA on the first link responsive to receiving the first MPDU. In such cases, in enabling the transmission of the one or more initial control frames, process 900 may involve processor 812 performing certain operations. For instance, process 900 may involve processor 812 receiving, from the STA, a second MPDU during the TXOP requesting to enable the transmission of the one or more initial control frames in the subsequent frame exchanges. Furthermore, process 900 may involve processor 812 enabling the transmission of the one or more initial control frames in the subsequent frame exchanges with the STA on the first link responsive to receiving the second MPDU.

Alternatively, or additionally, in performing the frame exchange without the transmission of the initial control frame, process 900 may involve processor 812 performing certain operations. For instance, process 900 may involve processor 812 receiving, from a STA affiliated with the second MLD, a MPDU requesting to disable transmission of the initial control frame. Additionally, process 900 may involve processor 812 disabling transmission of the initial control frame in the frame exchange with the STA on the first link for a duration indicated in the MPDU responsive to receiving the MPDU. In such cases, in enabling the transmission of the one or more initial control frames, process 900 may involve processor 812 enabling the transmission of the one or more initial control frames in the subsequent frame exchanges with the STA on the first link at an end of the duration.

Alternatively, or additionally, in performing the frame exchange without the transmission of the initial control frame, process 900 may involve processor 812 performing certain operations. For instance, process 900 may involve processor 812 determining that a second STA affiliated with the second MLD enters a power-save mode on a second link of the multiple communication links, thereby rendering the first link to be an EMLSR link in an active mode while remaining one or more other links of the multiple communication links are not (e.g., the first link is the only EMLSR link in the active mode). Moreover, process 900 may involve processor 812 disabling transmission of the initial control frame in the frame exchange with a first STA affiliated with the second MLD on the first link responsive to determining that the second STA is entering the power-save mode on the second link. In such cases, in enabling the transmission of the one or more initial control frames, process 900 may involve processor 812 taking one of several approaches.

In a first approach, in enabling the transmission of the one or more initial control frames, process 900 may involve processor 812 receiving, from the first STA, a MPDU during the TXOP requesting to enable transmission of the initial control frames in the subsequent frame exchanges. Additionally, process 900 may involve processor 812 enabling the transmission of the one or more initial control frames in the subsequent frame exchanges with the first STA on the first link responsive to receiving the MPDU.

In a second approach, in enabling the transmission of the one or more initial control frames, process 900 may involve processor 812 enabling the transmission of the one or more initial control frames in the subsequent frame exchanges with the first STA on the first link after passage of a predefined duration since remaining one or more other STAs affiliated with the second MLD, other than the first STA, entered the power-save mode.

In a third approach, in enabling the transmission of the one or more initial control frames, process 900 may involve processor 812 determining that the second STA or one other STA affiliated with the second MLD is exiting the power-save mode on the second link or another link of the multiple communication links, thereby rendering the first link to be not the only-one remaining EMLSR link in the active mode. Furthermore, process 900 may involve processor 812 enabling the transmission of the one or more initial control frames in the subsequent frame exchanges with the first STA on the first link responsive to determining that the second STA or the other STA is exiting the power-save mode.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

performing, by a processor of a first multi-link device (MLD), a frame exchange with a second MLD on a first link of multiple communication links without transmission of an initial control frame; and enabling, by the processor, transmission of one or more initial control frames in subsequent frame exchanges with the second MLD on the first link, wherein the performing of the frame exchange without the transmission of the initial control frame comprises:

receiving, from a station (STA) affiliated with the second MLD, a first medium access control (MAC) protocol data unit (MPDU) requesting to disable transmission of the initial control frame; and disabling transmission of the initial control frame in the frame exchange with the STA on the first link responsive to receiving the first MPDU.

2. The method of claim 1, wherein the performing of the frame exchange without the transmission of the initial control frame comprises disabling transmission of the initial control frame on the first link when the first link is an only-one enhanced multi-link single radio (EMLSR) link among the multiple communication links in an active mode while all other links of the multiple communication links are not.

3. The method of claim 1, wherein the enabling of the transmission of the one or more initial control frames comprises:

receiving, from the STA, a second MPDU requesting to enable transmission of the initial control frames in the subsequent frame exchanges; and enabling transmission of the initial control frames in the subsequent frame exchanges with the STA on the first link responsive to receiving the second MPDU.

4. The method of claim 1, wherein the performing of the frame exchange without the transmission of the initial control frame comprises:

receiving, from a station (STA) affiliated with the second MLD, a medium access control (MAC) protocol data unit (MPDU) requesting to disable transmission of the initial control frame; and disabling transmission of the initial control frame in the frame exchange with the STA on the first link for a duration responsive to receiving the MPDU, wherein the duration is indicated or determined according to the MPDU.

5. The method of claim 4, wherein the enabling of the transmission of the one or more initial control frames comprises:

enabling transmission of the initial control frames in the subsequent frame exchanges with the STA on the first link at an end of the duration.

6. The method of claim 1, wherein the performing of the frame exchange without the transmission of the initial control frame comprises:

determining that a second station (STA) affiliated with the second MLD enters a power-save mode on a second link of the multiple communication links, thereby rendering the first link to be an only-one enhanced multi-link single radio (EMLSR) link among the multiple communication links in an active mode while all other links of the multiple communication links are not; and disabling transmission of the initial control frame in the frame exchange with a first STA affiliated with the second MLD on the first link responsive to determining that the second STA is entering the power-save mode on the second link.

7. The method of claim 6, wherein the enabling of the transmission of the one or more initial control frames comprises:

receiving, from the first STA, a medium access control (MAC) protocol data unit (MPDU) requesting to enable transmission of the initial control frames in the subsequent frame exchanges; and enabling transmission of the initial control frames in the subsequent frame exchanges with the first STA on the first link responsive to receiving the MPDU.

8. The method of claim 6, wherein the enabling of the transmission of the one or more initial control frames comprises:

enabling transmission of the initial control frames in the subsequent frame exchanges with the first STA on the first link after passage of a predefined duration since remaining one or more other STAs affiliated with the second MLD, other than the first STA, entered the power-save mode.

9. The method of claim 6, wherein the enabling of the transmission of the one or more initial control frames comprises:

determining that the second STA or one other STA affiliated with the second MLD is exiting the power-save mode on the second link or another link of the multiple communication links, thereby rendering the first link to be not the only-one EMLSR link in the active mode; and enabling transmission of the initial control frames in the subsequent frame exchanges with the first STA on the first link responsive to determining that the second STA or the other STA is exiting the power-save mode.

10. An apparatus implementable in a first multi-link device (MLD), comprising:

a transceiver configured to communicate wirelessly; and a processor coupled to the transceiver and configured to reduce power consumption while supporting a latency-sensitive application by performing operations comprising:

performing, via the transceiver, a frame exchange with a second MLD on a first link of multiple communication links without transmission of an initial control frame;

and enabling, via the transceiver, transmission of one or more initial control frames in subsequent frame exchanges with the second MLD on the first link, wherein the performing of the frame exchange without the transmission of the initial control frame comprises:

receiving, from a station (STA) affiliated with the second MLD, a first medium access control (MAC) protocol data unit (MPDU) requesting to disable transmission of the initial control frame; and disabling transmission of the initial control frame in the frame exchange with the STA on the first link responsive to receiving the first MPDU.

11. The apparatus of claim 10, wherein the performing of the frame exchange without the transmission of the initial control frame on the first link comprises disabling transmission of the initial control frame on the first link when the first link is an only-one enhanced multi-link single radio (EMLSR) link among the multiple communication links in an active mode while all other links of the multiple communication links are not.

12. The apparatus of claim 10, wherein the enabling of the transmission of the one or more initial control frames comprises:

receiving, from the STA, a second MPDU requesting to enable transmission of the initial control frames in the subsequent frame exchanges; and enabling transmission of the initial control frames in the subsequent frame exchanges with the STA on the first link responsive to receiving the second MPDU.

13. The apparatus of claim 10, wherein the performing of the frame exchange without the transmission of the initial control frame comprises:

receiving, from a station (STA) affiliated with the second MLD, a medium access control (MAC) protocol data unit (MPDU) requesting to disable transmission of the initial control frame; and disabling transmission of the initial control frame in the frame exchange with the STA on the first link for a duration indicated in the MPDU responsive to receiving the MPDU.

14. The apparatus of claim 13, wherein the enabling of the transmission of the one or more initial control frames comprises:

enabling transmission of the initial control frames in the subsequent frame exchanges with the STA on the first link at an end of the duration.

15. The apparatus of claim 10, wherein the performing of the frame exchange without the transmission of the initial control frame comprises:

determining that a second station (STA) affiliated with the second MLD enters a power-save mode on a second link of the multiple communication links, thereby rendering the first link to be an only-one enhanced multi-link single radio (EMLSR) link among the multiple communication links in an active mode while all other links of the multiple communication links are not; and disabling transmission of the initial control frame in the frame exchange with a first STA affiliated with the second MLD on the first link responsive to determining that the second STA is entering the power-save mode on the second link.

16. The apparatus of claim 15, wherein the enabling of the transmission of the one or more initial control frames comprises:

receiving, from the first STA, a medium access control (MAC) protocol data unit (MPDU) requesting to enable transmission of the initial control frames in the subsequent frame exchanges; and enabling transmission of the initial control frames in the subsequent frame exchanges with the first STA on the first link responsive to receiving the MPDU.

17. The apparatus of claim 15, wherein the enabling of the transmission of the one or more initial control frames comprises:

enabling transmission of the initial control frames in the subsequent frame exchanges with the first STA on the first link after passage of a predefined duration since remaining one or more other STAs affiliated with the second MLD, other than the first STA, entered the power-save mode.

18. The apparatus of claim 15, wherein the enabling of the transmission of the one or more initial control frames comprises:

determining that the second STA or one other STA affiliated with the second MLD is exiting the power-save mode on the second link or another link of the multiple communication links, thereby rendering the first link to be not the only-one EMLSR link in the active mode; and enabling transmission of the initial control frames in the subsequent frame exchanges with the first STA on the first link responsive to determining that the second STA or the other STA is exiting the power-save mode.

\* \* \* \* \*